Jan. 3, 1961    M. W. BROSSMAN ET AL    2,966,796
FRACTURE TESTING DEVICE
Filed Sept. 27, 1957    2 Sheets-Sheet 2
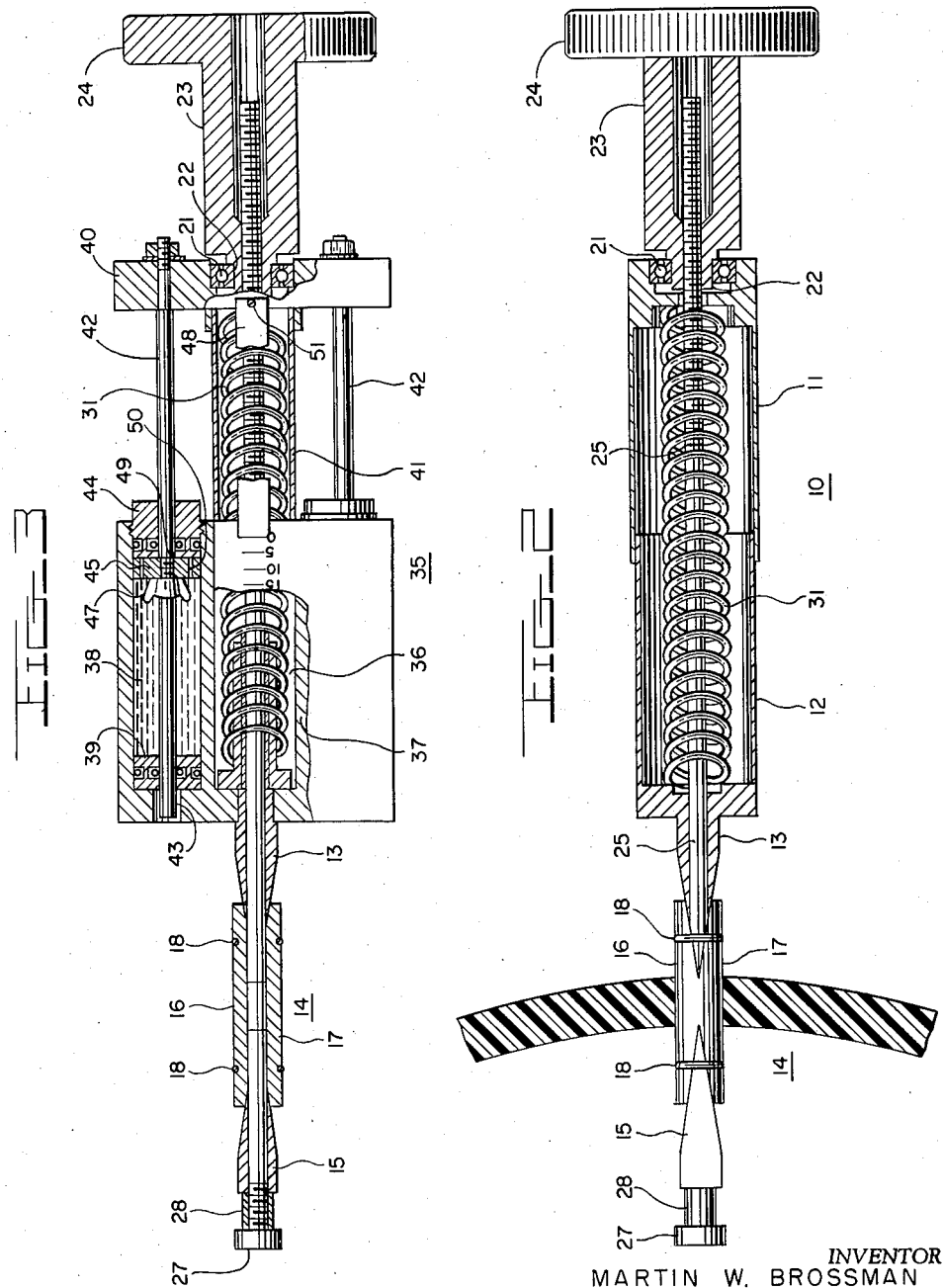
INVENTORS
MARTIN W. BROSSMAN
ROBERT K. CHAIMSON
BY 
ATTORNEYS

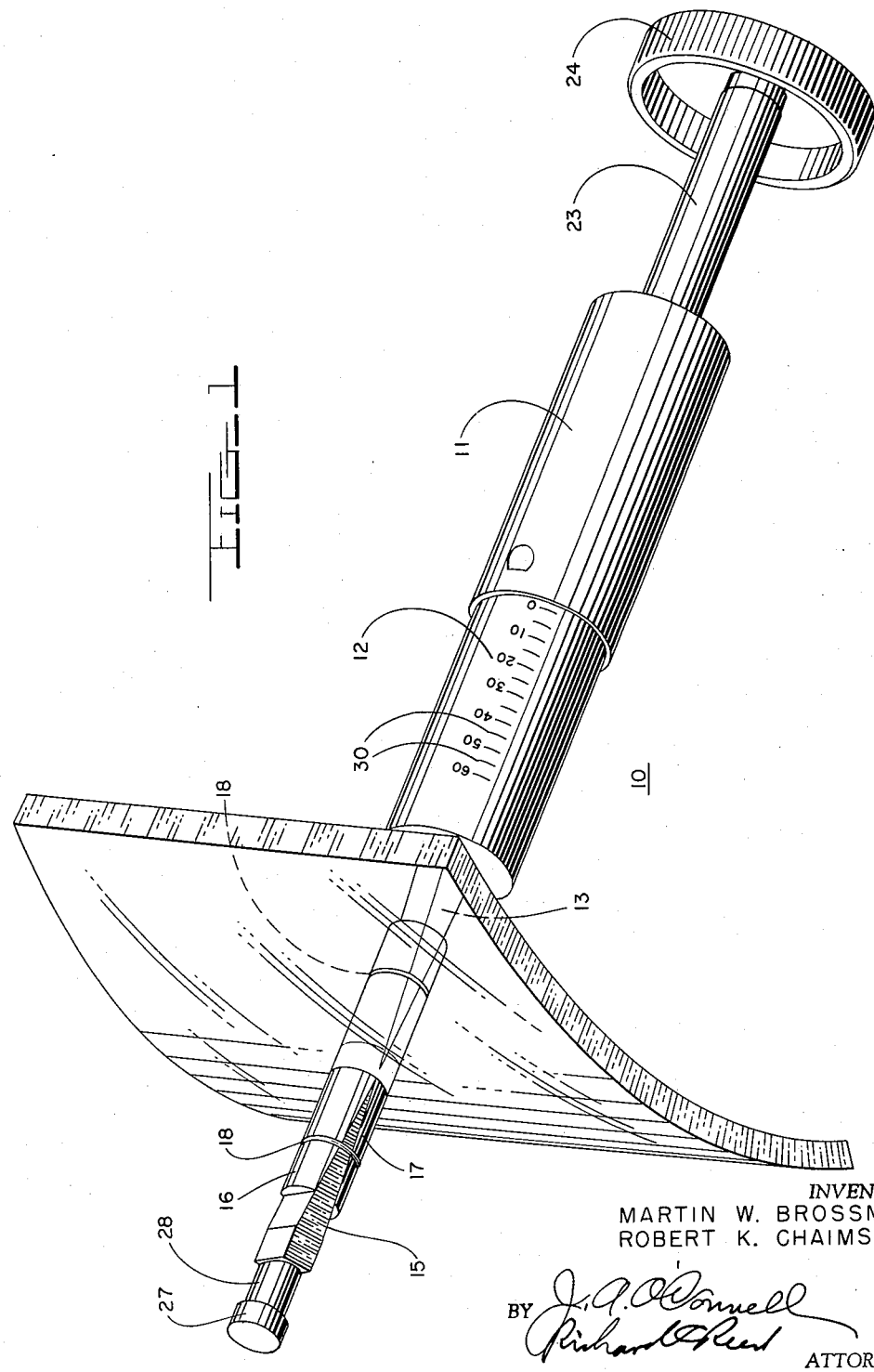

United States Patent Office 2,966,796
Patented Jan. 3, 1961

2,966,796

FRACTURE TESTING DEVICE

Martin W. Brossman, 4201 Massachusetts Ave. NW., Washington, D.C., and Robert K. Chaimson, 2507 Lake Ave., Cheverly, Md.

Filed Sept. 27, 1957, Ser. No. 686,799

4 Claims. (Cl. 73—88)

(Granted under Title 35, U.S. Code (1952), sec. 266)

The invention described herein may be manufactured and used by or for the Government of the United States of America for governmental purposes without the payment of any royalties thereon or therefor.

The present invention relates to material testing devices and more particularly to a fracture testing device for determining material properties.

The design of structures are based on many properties of the material used and especially on the fracture property. A specific knowledge of a material property defined as the crack extension force tendency, $Gc$, is important in selecting the most satisfactory material to be used for a structure, and for designing a fracture-safe structure under specified conditions.

Heretofore, various devices have been used to measure the fracture property, $Gc$, which consisted of applying a uniformly distributed stress to a plate of material containing a central crack. Stresses are usually applied by gripping the edges of the material and applying a load to the material. These devices are cumbersome, usually requiring considerable amounts of space and requiring use of samples of the material having specific shapes which are limited to flat surfaces or to singly curved plates of specific radius of curvature conforming to the radius of curvature of special gripping means.

It is therefore an object of the present invention to provide a new fracture testing device.

Another object is to provide a device capable of determining the fracture resistance of materials having various shapes or forms.

Still another object is to provide a simple, small, compact and reliable fracture testing device suitable for hand operation "in the field" as well as within a plant and to provide a device which permits quick determinations of $Gc$.

Yet another object is to provide a small portable device which is easily operated by inexperienced personnel with limited instruction.

Other and more specific objects of this invention will become apparent upon a careful consideration of the following detailed description when taken together with the accompanying drawings, in which:

Fig. 1 is a side elevation view of the device;

Fig. 2 is a longitudinal section view illustrating the various parts of the device; and Fig. 3 is a modification of the device shown partly in section to illustrate the various parts.

The present invention in general terms is directed to a hand held and operated fracture testing device which will permit quick determinations of the fracture property, $Gc$, of a material which is not restricted to a particular shape. The device comprises a load indicating system with a double wedge assembly which during operation is positioned within a hole in a piece of material. A loading wheel on one end of the device is associated with the wedge assembly such that rotation of the wheel will apply a load to a compression spring and to the wedge assembly which applies separation forces to the material. The crack extension force is determined by a reading taken directly from the side of the housing which indicates the separation force applied to the test material.

Now, referring to the drawings wherein like reference characters indicate like parts throughout, there is shown by illustration in Figs. 1 and 2 a device according to the present invention which comprises a tubular housing 10 formed of two pieces 11 and 12 such that one piece telescopes into the other. One end 12 of the housing has a wedge shaped piece 13 rigidly connected thereto by any suitable means to form one wedge of a wedge assembly 14. The wedge assembly comprises the wedge 13, a second wedge 15 and two identical pieces 16 and 17 which are retained about the wedges by any suitable means such as spring wires 18. The pieces 16 and 17 are formed from a cylindrical piece of material split through the center along the longitudinal axis and shaped or cut at each end along the cut surfaces to provide matching face surface with the faces of the wedges 13 and 15.

The housing section 11 is closed at the outer end and adapted to receive a ball bearing assembly 21 which is pressed into the end and held therein by friction. The ball bearing assembly receives a cut-down end 22 of a wheel extension 23 which extends from load wheel 24 and which is pressed into the bearing for a relatively tight fit. The load wheel 24 has a threaded passage through the center along the axis, which is threaded onto an elongated threaded rod 25 that extends through the extension 23, the housing 10, and the wedge assembly 14. A nut 27 is threaded onto the end of the rod which extends through the wedge assembly and is tightened against a second nut or spacer 28 to maintain the rod within the assembly and to apply the load to the wedge assembly. Wheel 24 is secured in place in the bearing assembly by the cut-down end 22 and rotates with the bearings as the threaded wheel screws along the threaded rod. A separation force measuring compression spring 31 is positioned about the rod 25 between the closed ends of each of the housing sections 11 and 12 for the purpose of applying the load and measuring the separation force. The separation force is indicated by calibrated graduations 30 indicated along section 12 of the housing according to the distance housing 11 is moved along housing 12 by the force applied by the threaded wheel against the spring.

Operation of the device to apply a separation force to a piece of material in order to determine the crack extension force, $Gc$, is as follows: A hole approximately the size of the wedge assembly is bored into the material and then a crack of about ⅛ inch in length is started from each side along the center line of the drilled hole. The wedge assembly is inserted into the hole such that the wedge surfaces will exert a force perpendicular to the cracks which are started in the material. The load wheel 24 is rotated clockwise which threads the threaded rod into the wheel extension and applies a load to the outer end of wedge 15 forcing the wedge into the wedge assembly. At the same time that wedge 15 is being forced into the wedge assembly, the housing 11 is being forced against spring 31 with the same load as applied to wedge 15. The load on the spring forces wedge 13 into the assembly at the same rate as wedge 15 which tends to separate the pieces 16 and 17 by forcing them against the material to apply the separation force to the material. The load on the spring applied by the load wheel is indicated by the distance in which the housing section 11 telescopes into housing section 12.

Since the load on the spring is proportional to the separation force applied to the test material, graduations 30 can be established on the housing 12 to indicate the separation force directly. These graduations are established by a simple calibration in which the test material is replaced by a suitable standard force measuring device. Advancing the loading wheel applies a resultant force through the wedge assembly 14 to the force measuring device, thereby establishing force graduations on housing 12.

In test use the load wheel is rotated until the material is separated to form a crack of a predetermined length at which time the force measurement indicated by housing section 12 is noted. (Care must be taken that the wheel is steadily rotated for steady advancement of the wedges to insure proper calibration compensation for wedge friction.) From the load force applied to the material by the device, the crack length relationship and the modulus of elasticity for the material, Gc, the crack extension force, can then be calculated directly by using the following formula:

$$Gc = \frac{P^2}{\pi E a}$$

where $a=$ the distance in inches from the central axis of the hole to the end of the crack.
$P=$ the separation force (lbs.) applied to the material by the device.
$E=$ Young's modulus (lb./in.$^2$).

A separation force applying device as described above can be used for materials which have various shapes for instance, cockpit canopies for airplanes, plastic bodies for any type device or for materials having flat surfaces. The shape of the material being tested is not critical since material of any shape can be tested.

When testing some materials having special shapes, or small pieces, the crack may extend across the whole piece to separate the material into two parts. In this case, the force spring 31 would instantly force the housing 11 back because the spring will not be under compression unless there is a counteracting force on the wedge assembly. To prevent harmful effects to the operator or possibly to the device, the modification as shown by Fig. 3 can be used.

The device as shown in Fig. 3 operates in the same manner as the device of Fig. 1 but includes an arresting mechanism for preventing a quick return of the force spring to an unloaded position. The modification of Fig. 3 includes an arresting means, a wedge assembly 14, the threaded rod 25, the ball bearing assembly 21 and the load wheel 24 with the cut down end 22 on extension 23 pressed into ball bearing assembly 21. The housing includes a rectangular shaped body 35 which has three cylindrical sections or chambers 36, 37 and 38. The central section 36 has wedge 13 connected thereto and carries the force spring 31 positioned about rod 25 between the end of the housing and a sleeve 41 that telescopes into the housing. The sleeve 41 connects with a cross bar 40 which has the bearing assembly 21 secured in the outer end thereof, wherein the cross bar is secured across the sleeve perpendicular to the axis of the sleeve. The bar has rods 42 secured to the ends thereof that extend therefrom through the sections 37 and 38 along the axis thereof. Each of the sections 37 and 38 are provided with a seal retainer 39 positioned at the bottom of each section which has two O-ring seals thereon. One O-ring presses against the rods and the other O-ring presses against the side of the chamber to prevent fluid from leaking through the holes 43 through which the rods 42 pass. The upper end of the chamber is sealed by a nut 44 which also has a double O-ring seal therein for sealing against leakage by the rods 42 and against the walls of the chamber. The seals at each end of the chambers 37 and 38 are for the purpose of preventing leakage of a viscous damping fluid put into the chamber to damp the travel of the sleeve 41 with respect to the chamber 36. Rods 42 have a piston 45 within the chambers held thereon between a nut 47 and a shoulder 49 on the rods. The piston has two small holes 50 therein which allows the fluid to pass from one side of the piston to the other during use of the device.

The rectangular housing has graduations thereon graduated in pounds according to the calibration of the load spring 31 within chamber 36. A pointer 48 is secured to the cross bar 40 by a screw 51 such that when the device has no force on the wedge assembly the end of the pointer will indicate zero pounds. The load calibration can also be engraved on sleeve 41 with either the top edge of housing 35 serving as the load pointer or a load pointer attached to housing 35.

The operation of the device of Fig. 3 is the same as described for the device of Fig. 1 and is not seen to warrant further discussion as to the operation thereof. The major difference is the addition of damping means which arrests the back pressure of the force spring if the specimen cracks into two pieces or there is a sudden separation of the material being tested.

The force required to separate the material under test depends on the material properties. The device herein described affords a simply operated device which can apply large separation forces with little effort on the operator's part and a device which requires little skill for satisfactory operation. Furthermore the devices made according to the present invention permits determination of fracture properties of materials existing in complex formed shapes.

Obviously modifications and variations of the present invention are possible in the light of the above teachings. It is therefore to be understood that within the scope of the appended claims the invention may be practiced otherwise than as specifically described.

What is claimed is:

1. A fracture test device which comprises a two section housing adapted to permit one section to telescope into the other section, a double wedge assembly positioned opposite the outer end of one section of said housing, a load means rotatably secured to the outer end of the other section of said housing, a rod adapted to pass through said housing and said wedge assembly, said rod adapted to be screw threaded into said load means and secured at the outer end of said wedge assembly, a force spring means positioned within said housing and adapted to apply a force on said wedge assembly simultaneously with rotation of said load wheel, and means adapted to indicate the force applied to a piece of material by said wedge assembly.

2. A fracture test device as claimed in claim 1 in which the device includes a force dampening means.

3. A fracture test device comprising a wedge assembly which comprises separate expansion sections adapted to be positioned within an opening in a test material, a load wheel, a rod passing through said wedge assembly and connected with said load wheel, a force spring positioned about said rod between said wedge assembly and said load wheel and adapted to apply a force to said wedge assembly through rotation of said load wheel, means adapted to indicate the force applied to a piece of material by said wedge assembly through operation of said load wheel against said force spring, and means for damping the spring force applied to said material upon fracture of said test material.

4. A fracture test device comprising a housing, a double wedge assembly comprising separate expansion sections positioned on one end of said housing adapted to be positioned within an opening in a piece of material, a load wheel on the opposite end of said housing, a rod passing through said housing and said wedge assembly, said rod being secured at one end on the outer end of said wedge assembly and screw threaded into said load wheel at the opposite end, a force spring positioned within said housing about said rod, means adapted to indicate the force applied to a piece of material by said load wheel acting against said force spring and said wedge assembly, and means for damping the spring force applied to said material upon fracture of said test material.

References Cited in the file of this patent

UNITED STATES PATENTS

| | | |
|---|---|---|
| 1,328,349 | Webb | Jan. 20, 1920 |
| 1,887,327 | Readey | Nov. 8, 1932 |
| 2,297,648 | Cushman | Sept. 29, 1942 |
| 2,841,402 | Drew | July 1, 1958 |
| 2,898,761 | Hast | Aug. 11, 1959 |